United States Patent [19]

Chaudhuri

[11] 4,300,964

[45] Nov. 17, 1981

[54] ADHESION OF TEXTILE CORDS TO RUBBER BY DIP COATING USING AN N-METHYLOL GROUP CONTAINING POLYMER

[75] Inventor: Ajit K. Chaudhuri, Piscataway, N.J.

[73] Assignee: American Cyanamid Company, Stamford, Conn.

[21] Appl. No.: 87,199

[22] Filed: Oct. 22, 1979

[51] Int. Cl.$^3$ .......................... B29H 5/02; C09J 3/12
[52] U.S. Cl. ........................ 156/110 A; 156/110 MD; 156/335; 156/338; 260/29.4 UA; 427/175; 427/389.9; 427/430.1; 428/395; 525/134; 525/139

[58] Field of Search ........... 156/110 A, 110 MD, 335, 156/338; 260/29.4 UA; 427/175, 389.9, 392, 430.1; 428/250, 263, 264, 267, 290, 288, 395; 525/134, 139

[56] References Cited

U.S. PATENT DOCUMENTS

| | | | |
|---|---|---|---|
| 3,097,109 | 7/1963 | Danielson | 427/389.9 X |
| 3,194,294 | 7/1965 | Van Gils | 152/330 |
| 3,964,950 | 6/1976 | Boles | 156/110 A |
| 3,968,295 | 7/1976 | Solomon | 427/430.1 X |

Primary Examiner—Michael R. Lusignan
Attorney, Agent, or Firm—Frank M. Van Riet

[57] ABSTRACT

A tire cord dipping composition and a method of adhering textile materials to rubber, are disclosed, wherein an N-methylol group containing polymer is employed.

11 Claims, No Drawings

ADHESION OF TEXTILE CORDS TO RUBBER BY DIP COATING USING AN N-METHYLOL GROUP CONTAINING POLYMER

BACKGROUND OF THE INVENTION

It is conventional practice in the rubber industry to adhere rubber textile, glass fiber and/or steel wire by utilizing one of two methods. The "in situ" formation of an adhesive resin at the rubber-cord interface is used primarily with brass-coated steel wire in the fabrication of steel-belted radial tires while the dip coating of textile fibers or of isocyanate-epoxy pretreated or chlorinated phenol pretreated polyester fibers prior to embedding in the rubber stock by vulcanization is the conventional procedure used with non-steel cords. The present invention relates to the latter procedure. Conventional dip coating is done using, as the adhesive coating, a mixture of a styrene-butadiene-vinylpyridine rubber latex and a resorcinol-formaldehyde resin. This is widely known as the RFL system.

SUMMARY OF THE INVENTION

The present invention utilizes as a dip coating a mixture of (1) natural rubber latex, a styrene-butadiene latex or a polybutadiene latex, (2) a resorcinol-formaldehyde resin, and (3) an N-methylol group containing polymer.

The adhesion system of the invention has advantages over the conventional RFL system and provides equal or better adhesion. The advantages include (1) lower cost, since N-methylol group containing polymers are less expensive than vinylpyridine; (2) greater versatility, since any commercially available, natural rubber, styrenebutadiene rubber or polybutadiene rubber latex can be used; (3) increased economy, since equal adhesion is obtained using lesser amounts of the N-methylol group containing polymer relative to the amount of vinylpyridine used in the conventional RFL latex; and (4) ease of use, since the amount of N-methylol group containing polymer can be varied more readily than having to prepare styrene-butadiene-vinyl-pyridine terpolymers with varying amounts of vinylpyridine.

DESCRIPTION OF THE INVENTION INCLUDING PREFERRED EMBODIMENTS

As mentioned above, the novel tire cord dipping composition of the present invention comprises a mixture of (1) natural rubber latex, a styrene-butadiene rubber latex or a polybutadiene rubber latex, (2) a resorcinol-formaldehyde resin and (3) an N-methylol group containing acrylamide polymer.

The conventional rubber latex used in the RFL system contains 15–20% styrene, 70% butadiene, 10–15% vinylpyridine. The latices useful in the present invention include natural rubber latice, styrene-butadiene copolymer latices containing up to 50% styrene or polybutadiene latices. Butadiene-acrylonitrile copolymer latices, butadiene-acrylic ester copolymer latices and the like, although less desired, may also be used. Styrene-butadiene latices and polybutadiene latices are preferred.

The resorcinol-formaldehyde resin used in the present invention is the same as used in conventional RFL systems. It is commercially available as a reaction product of the two components in aqueous alkaline solution, or it may be readily prepared, as shown in the accompanying examples.

The N-methylol group containing polymers useful herein can comprise any polymer containing at least about 30% by weight, of mono-N-methylol groups, the majority of the remainder being either acrylamide or methacrylamide recurring units. A portion of the acrylamide or methacrylamide groups may be replaced by groups represented by monoethylenically unsaturated monomers copolymerizable with either acrylamide or methacrylamide such as styrene, acrylonitrile, acrylic acid, alkyl acrylates and methacrylates such as ethyl acrylate, methyl methacrylate; diallyl dimethyl ammonium chloride etc. and the like. Of the recurring groups of the polymer which are not N-methylol containing groups, the acrylamide or methacrylamide groups should comprise at least about 90%, any other comonomers present comprising the remaining 10%.

The preferred N-methylol group containing polymer is poly (N-methylolacrylamide) which may be produced by methylolating polyacrylamide or by homopolymerizing N-methylolacrylamide, by procedures known in the art. The most practical method of preparing the N-methylol group containing polymers is to polymerize acrylamide or methacrylamide, alone or in admixture with any of the above-specified copolymerizable monomers, or in admixture with each other, to a molecular weight of at least about 10,000 and then to methylolate the resultant homopolymer or copolymer. If it is desired to produce the N-methylol group containing polymer by homopolymerizing N-methylolacrylamide alone or with the other comonomers polymerizable therewith, any known procedure useful therefor can be employed, such as for example, by utilizing a free-radical generating catalyst at elevated temperatures.

Since the viscosity of aqueous solutions of very high molecular weight N-methylol group containing polymers useful herein may be inconvenient for practical use because of insufficient solubility and excessive viscosity, it is preferred that the molecular weight thereof not exceed about 200,000.

The amide polymer may be methylolated by conventional means by reaction with formaldehyde. A minimum of at least about 30% of the theoretical degree of methylolation must be achieved, although 60–100% is desirable, 60–90% N-methylolation ordinarily being achieved by conventional methods of production.

The amount of N-methylol group containing polymer used in conjunction with the rubber latex and resorcinolformaldehyde resin solution will range from about 3–15 parts thereof per 100 parts of the dry-rubber solids in the latex.

Although the above discussion has been directed to the use of mono-N-methylol group containing polymers, it is within the scope of the present invention to employ di-N-methylol group containing polymer also. Since the methylol groups are the reactive functional groups of the polymers, the presence of two methylol groups on each or some nitrogen atoms of the recurring units thereof would merely necessitate a reduction in the amount of polymer necessary to achieve adequate bonding of the rubber stock to the tire cords.

The textile cords treated in accordance with the present invention include nylon, isocyanate-epoxy resin pretreated and chlorinated phenol pretreated polyester, glass fiber, rayon, cotton, aromatic polyimide fibers and the like. Nylon and polyester fibers are preferred.

The rubber stock to which the textile cords are bonded, in accordance with the invention, include natural rubber, styrene-butadiene (SBR) rubber, polybutadiene (PB), neoprene, butyl rubber, butadiene-acrylonitrile rubber (NBR), ethylene-propylene-diene rubber (EPDM), and the like. Natural rubber and SBR, or mixtures thereof, are preferred.

The following examples are set for purposes of illustration only and are not to be construed as limitations on the present invention except as set forth in the appended claims. All parts and percentages are by weight unless otherwise specified. Adhesion measurements therein are based on the H-Test or the Uniroyal Hot-Peel Test each of which is described below.

Method for Testing Static Adhesion of Textile Cords to Rubber (H-Test); ASTM D-2138-72, Sections 5–10

The H-Test is designed to measure the force required to pull a cord, in the direction of its axis, from a strip of rubber in which the ends of the cord are embedded. The property measured is a shearing force acting at the cord-rubber interface. The test specimen consists of two endstrips of rubber with an interconnecting cord, resembling an H. Each specimen has a single cord embedded in the center of each of the two end-strips of rubber, which are ¼"×1" (approx.). The specimens are vulcanized for 18–20 minutes at 307° F. and then aged for at least 16 hours at 23°±2° C. prior to testing. Data are recorded as pounds of pull (lbs. force) to separate the cord from the rubber, or in Newtons (10 N=2.248 lbs. force).

Method for Testing Adhesion of Solution Dipped Tire Cord to Rubber (Uniroyal Hot-Peel Test)

A strip of 15 to 20-gauge tire stock, about 4" wide, is covered with dipped tire cords (about 25–28 cords/inch) laid perpendicular to the strip. Another strip of rubber stock is applied over the cords. This procedure is repeated so that a laminate is obtained consisting of two sets of cord between three strips of rubber. The laminate is vulcanized using an electrically heated press for 8 minutes at 165° C. and 200–300 lbs. (psi) pressure. After cooling, specimens 1"×3" are cut for testing, discarding ½" on either end of the strip. The test strips are then heated for 20–30 minutes at 121° C. before testing on an Instron Tensile Tester by peeling the rubber away from the cords. The force required to peel the rubber away is a measure of the adhesive strength of the bond. Following separation, the appearance of the peel is rated on a scale of 1–5 as follows (5=best):

5-All rubber tear, no bare cords
4-75% rubber tear, 25% bare cords
3-50% rubber tear, 50% bare cords
2-25% rubber tear, 75% bare cords
1-0 rubber tear, 100% bare cords

EXAMPLE A

Preparation of Resorcinol-Formaldehyde Resin Solution

To 623 parts of water are added 23 parts, or resorcinol, 26 parts of 37% aqueous formaldehyde, and 20 parts of 10% sodium hydroxide solution. The solution is then aged at room temperature for at least 4 hours before use.

EXAMPLES B AND C

Preparation of Latex-Resin Mixture

To 244 parts of each of (B) a 25:75-styrene butadiene copolymer latex (41% solids) and (C) a styrene-butadiene-vinyl pyridine (15:70:10) terpolymer latex are added 340 parts of the resorcinol-formaldehyde resin solution of Example A. The mixtures are then aged overnight (at least 16 hours) before use.

EXAMPLE D

Methylolatin of Amide Polymer

The amide polymers used in the following examples are dissolved in water to provide a 16.66% solution (except the copolymer of 97% acrylamide-3% acrylic acid copolymer, which is 6.67%) and 37% formaldehyde solution is added (30–35 mole percent excess, based on amide groups). The pH is brought to 9–9.5 with sodium hydroxide or to 8–8.1 with triethanolamine, and allowed to stand for a period of about 10–15 hours before use.

EXAMPLE E

Preparation of Dip Coating Composition

The N-methylolated polymer is added in the appropriate amount to the mixture of rubber latex and resorcinolformaldehyde resin. No aging is done and the polymer is added to the mixture just prior to dipping the cords.

In the following examples, the rubber composition to which the dipped cords are bonded is as follows:

| Component | Parts by Weight |
| --- | --- |
| Natural rubber | 70 |
| Styrene-butadiene rubber (23.5:76.5) | 30 |
| Carbon black | 30 |
| Zinc oxide | 5 |
| Stearic acid | 2 |
| Processing oil | 4 |
| N-oxydiethylene benzothiazole-2-sulfenamide | 1.13 |
| Sulfur | 2 |

The nylon cords are 2-ply and of 1260 denier; the polyester cords are 3-ply and of 1000 denier.

The latices used are:
(1) Styrene (25)-butadiene(75), about 41% solids;
(2) Styrene (15)-butadiene (70)-vinyl-pyridine (15), about 41% solids;
(3) 100% Polybutadiene
(4) Styrene-(50)-butadiene(50);
(5) Natural rubber latex

EXAMPLE F

Cord Dipping Procedure

Nylon cords are fed through the adhesive dip bath and pick up is controlled in the range of about 4–8% by weight of cord. The dipped cords are dried at 218° C. for about one minute in an oven.

Untreated polyester cords are fed through a bath containing an isocyanate pre-dip (5% solution) and dried for one minute at 227° C. The resultant cords are then fed into the coating mixture with 4–7% pick up and dried at 218° C. for about one minute. Pre-activated polyester cords are fed through the coating mixture in the same manner as with nylon cords and dried in a similar way.

EXAMPLE 1

Nylon cords are coated by dipping using a dipping composition consisting of a styrene-butadiene latex (25:75), a resorcinol-formaldehyde resin solution, and an approximately 70% N-methylolated polyacrylamide (MPAM) (mol wt~49,000). Adhesion is measured using the H-Test versus cords similarly treated with (A) a conventional RFL system and (B) a composite mixture of the styrene-butadiene latex plus resorcinol-formaldehyde resin solution. Results are shown in Table I.

TABLE I

| Run No. | Parts-MPAM* | H-Test (Newtons) |
|---|---|---|
| 1 | 13 | 170.4 ± 18.7 |
| 2 | 13 | 163.7 ± 14.7 |
| 3 | 13 | 167.3 ± 12.9 |
| 4 | 10.4 | 150.0 ± 18.2 |
| 5 | 9.5 | 161.9 ± 15.1 |
| 6 | 8.7 | 151.2 ± 10.2 |
| 7 | 6.9 | 149.5 ± 13.3 |
| 8 | 4.3 | 134.8 ± 13.8 |
| 9 | 4.3 | 135.7 ± 12.9 |
| 10 | Control (B) | 111.2 ± 10.2 |
| 11 | Control (B) | 106.7 ± 13.8 |
| 12 | Control (A) | 170.8 ± 14.7 |
| 13 | Control (A) | 157.5 ± 22.7 |

*parts by weight per 100 parts of dry rubber latex solids

The data in Table I show that the coating of the invention is better than the control without vinylpyridine (Control B) and as good as a standard RFL system, (Control A).

EXAMPLE 2

The procefure of Example 1 is repeated except that the adhesion is determined using the Hot-Peel Test. Results are shown in Table II.

TABLE II

| Run No. | Parts-MPAM* | Rating | Avg. Hot-Peel Test (Newtons) |
|---|---|---|---|
| 14 | 13 | 5 | 179.7 |
| 15 | 13 | 5 | 151.7 |
| 16 | 13 | 5 | 143.7 |
| 17 | 8.7 | 5 | 145.9 |
| 18 | 8.7 | 5 | 152.1 |
| 19 | Control (B) | 3/3.5 | 126.3 |
| 20 | Control (B) | 2.5/3.0 | 118.8 |
| 21 | Control (A) | 5 | 140.1 |

*See Table I

The data illustrate that the adhesion system of the invention provides as good as or better adhesion of nylon cords to rubber when compared to a standard RFL system (Control A) and better adhesion when compared to Control B.

EXAMPLE 3

In order to determine whether methylolated polyacrylamide will provide improved adhesion with other rubber latices, nylon cords are coated with the same coating system as in Example 1 except that the latex is varied. Results are shown in Table III.

TABLE III

| Run No. | Rubber Latex | Parts-MPAM* | H-Test (Newtons) |
|---|---|---|---|
| 22 | Polybutadiene (100%) | — | 88.5 ± 11.1 |
| 23 | Polybutadiene (100%) | 15 (a) | 104.5 ± 10.7 |
| 24 | Styrene-butadiene (50/50)—1 | 0 | 128.1 ± 16.0 |
| 25 | Styrene-butadiene (50/50)—1 | 15 (a) | 143.2 ± 11.6 |
| 26 | Styrene-butadiene (50/50)—2 | — | 97.0 ± 12.9 |
| 27 | Styrene-butadiene (50/50)—2 | 10.2 (b) | 112.5 ± 12.0 |
| 28 | Styrene-butadiene (50/50)—2 | 10.2 (b) | 109.4 ± 9.3 |

(a) 70% Methylolated polyacrylamide, mol wt ~ 45,000
(b) 70% Methylolated polyacrylamide, mol wt ~ 49,000
*See Table I The data show that good adhesion is obtained using polybutadiene latex or 50% styrene-50% butadiene Copolymer latex.

EXAMPLE 4

Polyester tire cords are pretreated with a commercially available isocyanate solution and then coated with the composition of the invention using as the methylolated polymer (A) a 70% methylolated polyacrylamide (mol wt~49,000); (B) a 90% methylolated copolymer of 95% acrylamide-5% diallyl dimethyl ammonium chloride (mol wt~12,000); and (C) a 60% methylolated copolymer of 97% acrylamide-3% acrylic acid (mol wt~200,000). Adhesion was measured using the H-Test. Results are given in Table IV.

TABLE IV

| Run No. | Polymer | Parts-MPAM* | H-Test (Newtons) |
|---|---|---|---|
| 29 | A | 13 | 162.8 ± 16.0 |
| 30 | A | 13 | 149.0 ± 14.7 |
| 31 | B | 14 | 163.8 ± 19.3 |
| 32 | B | 14 | 170.3 ± 18.3 |
| 33 | B | 10.6 | 147.3 ± 23.5 |
| 34 | B | 10.6 | 107.7 ± 19.5 |
| 35 | B | 7.2 | 142.6 ± 18.0 |
| 36 | B | 7.2 | 146.5 ± 20.2 |
| 37 | C | 6.7 | 168.6 ± 20.3 |
| 38 | C | 6.7 | 162.0 ± 16.3 |
| 39 | C | 4.8 | 119.8 ± 17.5 |
| 40 | C | 4.8 | 143.4 ± 18.2 |
| 41 | Control (A) | — | 160.6 ± 16.0 |
| 42 | Control (A) | — | 155.2 ± 16.5 |

The data indicate that adhesion of polyester tire cord to rubber, using the dip composition of the invention containing methylolated polymers of acrylamide, is as good as or better than that obtained with a standard RFL system (Control A).

EXAMPLE 5

The procedure of Example 4 is repeated using Polymer A and Polymer B except that adhesion is measured using the Hot-Peel Test. Results are given in Table V.

TABLE V

| Run No. | Polymer | Parts MPAM* | Rating | Avg. Peel Force (Newtons) |
|---|---|---|---|---|
| 43 | A | 12.8 | 4/4.5 | 148.1 |
| 44 | B | 13.8 | 4.5/5.0 | 178.7 ** |
| 45 | B | 13.8 | 5.0 | 176.8 |
| 46 | B | 9.7 | 4/4.5 | 157.6 ** |
| 47 | B | 9.7 | 4/4.5 | 150.7 |
| 48 | Control (A) | — | 4/4.5 | 155.1 |
| 49 | Control (A) | — | 4/4.5 | 143.5 ** |
| 50 | Control (A) | — | 4.5 | 148.1 |
| 51 | Control (A) | — | 4/4.5 | 147.6 |

**Brackets indicate duplicate tests
*See Table 1

The data indicate that the addition of a methylolated polymer of acrylamide or a methylolated copolymer of acrylamide-diallyl dimethyl ammonium chloride to a styrenebutadiene (25:75) latex plus resorcinol-formaldehyde resin provides adhesion as good as or better than a conventional RFL system.

EXAMPLE 6

The procedure of Example 4 is repeated using a commercially available pre-activated polyester tire cord and a dip coating composition containing (A) 70% methylolated polyacrylamide (mol wt~45,000); (B) a 90% methylolated copolymer of 95% acrylamide-5% diallyl dimethyl ammonium chloride (mol wt~12,000); and (C) a 60% methylolated copolymer of 97% acrylamide-3% acrylic acid (mol wt~200,000). Adhesion is determined using the H-Test. Results are given in Table VI.

TABLE VI

| Run No. | Polymer | Parts-MPAM* | H-Test (Newtons) |
|---|---|---|---|
| 52 | A | 13 | 100.3 ± 8.1 |
| 53 | A | 13 | 81.0 ± 9.7 |
| 54 | B | 14 | 125.1 ± 21.4 |
| 55 | C | 6.6 | 139.5 ± 13.9 |
| 56 | Control (A) | — | 70.8 ± 12.0 |
| 57 | Control (A) | — | 72.0 ± 6.7 |
| 58 | Control (A) | — | 67.7 ± 5.3 |
| 59 | Control (A) | — | 60.7 ± 5.7 |

The data indicate that the addition of the methylolated polymers to a styrene-butadiene (25:75) latex plus resorcinol-formaldehyde resin provides better adhesion of polyester cord to rubber than a standard RFL system.

EXAMPLE 7

Nylon cords are coated with a composition comprising a styrene-butadiene latex (25:75), resorcinolformaldehyde resin and (A) a 90% methylolated copolymer of 95% acrylamide-5% diallyl dimethyl ammonium chloride and (B) a 60% methylolated copolymer of 97% acrylamide-3% acrylic acid. The adhesion is measured using the H-Test. Results are given in Table VII.

TABLE VII

| Run No. | Polymer | Parts-MPAM* | H-Test (Newtons) |
|---|---|---|---|
| 60 | A | 14 | 190.5 ± 11.4 |
| 61 | A | 9.5 | 170.3 ± 14.1 |
| 62 | B | 9.8 | 180.7 ± 18.8 |
| 63 | B | 6.8 | 175.9 ± 15.4 |
| 64 | B | 4.9 | 180.6 ± 13.5 |
| 65 | Control (A) | — | 170.8 ± 14.6 |
| 66 | Control (A) | — | 157.5 ± 22.9 |

EXAMPLE 8

Nylon cords are dipped in a composition comprising styrene-butadiene (25:75) latex, resorcinol-formaldehyde resin, 70% methylolated polyacrylamide (mol wt~49,000) in the normal manner and the H-Test specimens subjected to adverse aging conditions as follows:
1. Oven-air aging at 121° C. for 48 hours
2. Humid-air aging at 85° C. an 100% R.H. for 96 hours.

Adhesion is determined using the H-Test. Results are given in Table VIII.

TABLE VIII

| Run No. | Parts-MP-AM* | Air Aging H-Test (Newtons) | | Humid Aging H-Test (Newtons) | |
|---|---|---|---|---|---|
| | | Sample | Control** | Sample | Control** |
| 67 | 13 | 87.7 ± 11.3 | 85.8 ± 4.5 | 94.3 ± 17.1 | 99.6 ± 21.4 |
| 68 | 13 | 87.9 ± 6.4 | 90.7 ± 15.8 | 98.9 ± 7.0 | 89.2 ± 22.3 |
| 69 | 9.5 | 80.6 ± 7.2 | 94.0 ± 7.5 | 110.4 ± 9.3 | 95.6 ± 22.7 |

**Standard RFL composition
*See Table I

EXAMPLE 9

Polyester tire cords, pretreated with a commercially available isocyanate coating, are coated with a dip composition comprising styrene-butadiene (25:75) latex, resorcinol-formaldehyde resin, 70% methylolated polyacrylamide (mol wt~49,000). The H-Test specimens are oven-air aged in the same manner as in Example 8 except they are aged for 24 hours. Results are given in Table IX.

TABLE IX

| Run No. | Parts-MPAM* | Air Aging H-Test (Newtons) | |
|---|---|---|---|
| | | Sample | Control** |
| 70 | 13 | 99.6 ± 9.0 | 98.6 ± 16.9 |
| 71 | 13 | 95.9 ± 13.2 | 79.8 ± 5.4 |
| 72 | 13 | 102.8 ± 12.5 | 81.9 ± 12.5 |

**Standard RFL System
*See Table I

EXAMPLE 10

The procedure of Example 1 is again followed except that the polyacrylamide is 30% N-methylolated and 15 parts are employed. Similar results are obtained.

I claim:

1. An aqueous dispersion, useful as a coating composition for the adhesion of a textile material to rubber, comprising (A) a rubber latex of natural rubber, butadiene-styrene rubber or polybutadiene rubber (B) a resorcinol-formaldehyde resin; and (C) from about 3 to about 15 parts by weight, based on 100 parts of dry rubber solids in said latex of a methylolated polymer of acrylamide having a molecular weight of at least about 10,000 and being from 60–100% methylolated.

2. An aqueous dispersion, useful as a coating composition for the adhesion of textile material to rubber, comprising (A) a rubber latex selected from styrene-butadiene latex containing up to 50% styrene, and polybutadiene latex; (B) a resorcinol-formaldehyde resin; and (C) from about 3 to about 15 parts by weight, based on 100 parts of dry rubber solids in said latex of a methylolated polymer of acrylamide having a molecular weight of at least about 10,000 and being from 60–100% methylolated.

3. Claim 2 wherein said latex is a styrene-butadiene latex containing 25% styrene.

4. Claim 2 wherein said latex is polybutadiene latex.

5. Claim 1 wherein said textile material is nylon tire cord.

6. Claim 1 wherein said textile material is pretreated polyester tire cord.

7. Claim 1 wherein said methylolated polymer of acrylamide is methylolated homopolyacrylamide.

8. Claim 1 wherein said methylolated polymer of acrylamide is a copolymer of a major proportion of acrylamide and a minor proportion of a copolymerizable mono-ethylenically unsaturated comonomer.

9. Claim 7 wherein said comonomer is diallyl dimethyl ammonium chloride.

10. Claim 7 wherein said comonomer is acrylic acid.

11. A method for promoting the adhesion of a textile material to rubber, comprising (1) coating said textile material with a composition comprising (A) a rubber latex selected from natural rubber, polybutadiene rubber and styrene-butadiene rubber containing up to 50% styrene, (B) a resorcinolformaldehyde resin, and (C) from about 3 to 15 parts based on 100 parts of dry rubber solids in said latex, of a methylolated polymer of acrylamide having a molecular weight of at least about 10,000 and being from 60–100% methylolated (2) placing said treated textile material in intimate contact with a vulcanizable rubber composition to which said textile material is to be bonded; and (3) vulcanizing the composition at a suitable temperature.

* * * * *